(12) United States Patent
Kure et al.

(10) Patent No.: US 8,099,938 B2
(45) Date of Patent: Jan. 24, 2012

(54) REAR DISCHARGE TYPE MOWER APPARATUS HAVING A PAIR OF AUXILIARY PLATES FOR DIRECTING GRASS TO A DISCHARGE OPENING

(75) Inventors: Masaji Kure, Kishiwada (JP); Yoshikazu Togoshi, Osaka (JP); Koji Fujiwara, Sakai (JP); Kazuo Samejima, Kaizuka (JP); Masatoshi Yamaguchi, Izumi (JP); Kazuo Koike, Kobe (JP); Yoshiyuki Esaki, Sakai (JP)

(73) Assignee: Kubota Corporation, Osaka (JP)

( * ) Notice: Subject to any disclaimer, the term of this patent is extended or adjusted under 35 U.S.C. 154(b) by 115 days.

(21) Appl. No.: 12/466,019

(22) Filed: Aug. 3, 2009

(65) Prior Publication Data

US 2009/0282799 A1 Nov. 19, 2009

Related U.S. Application Data

(62) Division of application No. 11/515,496, filed on Sep. 1, 2006, now Pat. No. 7,735,306.

(30) Foreign Application Priority Data

Sep. 29, 2005 (JP) ................................ 2005-284402
Jan. 12, 2006 (JP) ................................ 2006-004926

(51) Int. Cl.
*A01D 67/00* (2006.01)
(52) U.S. Cl. ...................... 56/320.2; 56/320.1
(58) Field of Classification Search .................... 56/5, 6, 56/16.6, 194, 320.1, 320.2
See application file for complete search history.

(56) References Cited

U.S. PATENT DOCUMENTS

| | | | | |
|---|---|---|---|---|
| 3,136,106 | A | * | 6/1964 | Joslin .............................. 56/13.6 |
| 4,226,074 | A | * | 10/1980 | Mullet et al. .................. 56/320.2 |
| 4,916,887 | A | | 4/1990 | Mullet et al. |
| 5,305,589 | A | | 4/1994 | Rodriguez et al. |
| 5,457,947 | A | | 10/1995 | Samejima et al. |
| 5,465,564 | A | | 11/1995 | Koehn et al. |
| 6,038,840 | A | | 3/2000 | Ishimori et al. |
| 6,052,980 | A | * | 4/2000 | Friesen ........................ 56/320.1 |
| 6,189,307 | B1 | | 2/2001 | Buss et al. |
| 6,192,666 | B1 | | 2/2001 | Sugden et al. |
| 6,681,553 | B2 | | 1/2004 | Ferree et al. |

FOREIGN PATENT DOCUMENTS

| | | |
|---|---|---|
| JP | 64-11625 U1 | 1/1989 |
| JP | 1-25547 Y2 | 7/1989 |
| JP | 1-130615 U1 | 9/1989 |

(Continued)

*Primary Examiner* — Thomas Will
*Assistant Examiner* — Mai Nguyen
(74) *Attorney, Agent, or Firm* — The Webb Law Firm

(57) ABSTRACT

A rear discharge type mower apparatus includes: a blade housing having a top plate, a front wall and at least one side wall and a first front guide plate and a second front guide plate. Each of the first and second front guide plates are located rearwardly of the front wall and have a shape extending substantially along a rotation path of a corresponding blade. The mower apparatus also includes a first auxiliary plate and a second auxiliary plate. A portion of the second auxiliary plate and the first auxiliary plate extend parallel to each other such that an opening that is opposed to a mowed grass discharge opening is formed by the rearward ends of the linear portion and the first auxiliary plate. The lower edges of the first and second auxiliary plates are closer to the top plate than the corresponding blade.

3 Claims, 13 Drawing Sheets

FOREIGN PATENT DOCUMENTS

| | | |
|---|---|---|
| JP | 3-000019 Y2 | 1/1991 |
| JP | 8-256556 A | 10/1996 |
| JP | 09-271236 A | 10/1997 |
| JP | 10-191744 A | 7/1998 |
| JP | 2003-310026 A | 11/2003 |
| JP | 2005-284402 | 4/2007 |
| JP | 2006-004926 | 7/2007 |

* cited by examiner

Fig.12
(A)
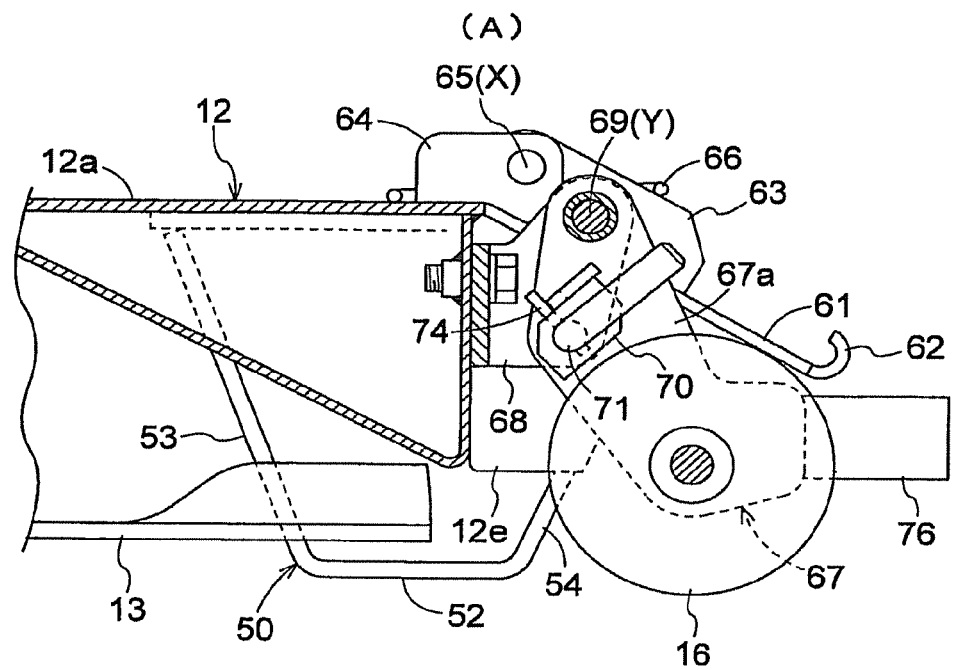
(B)
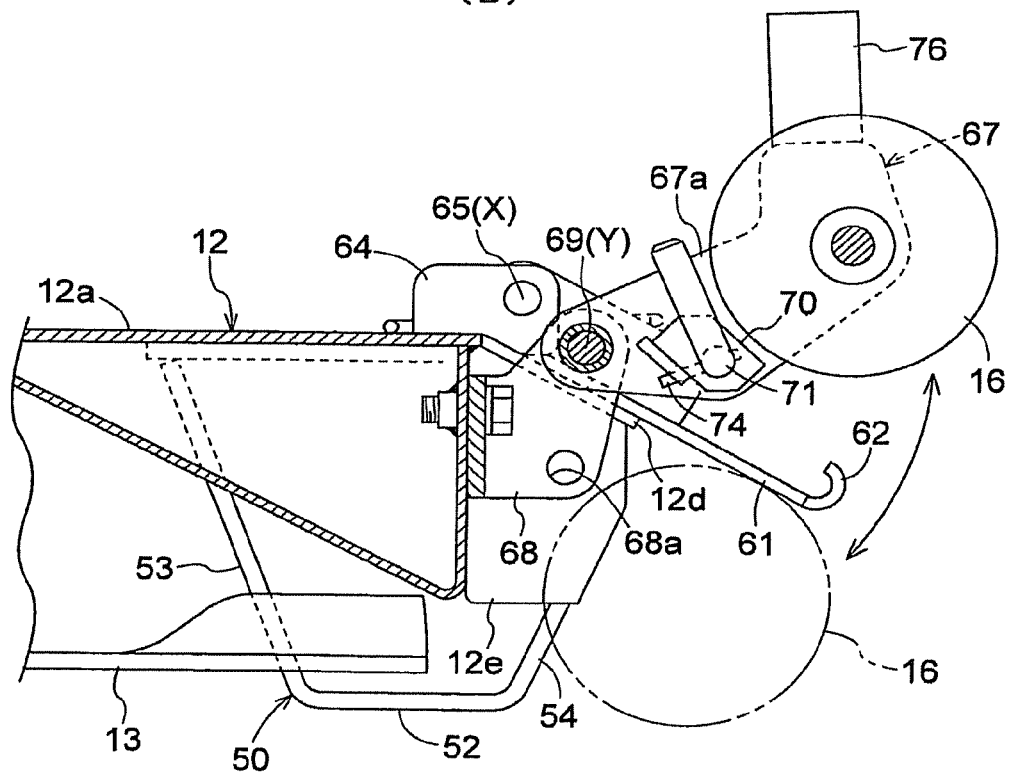

REAR DISCHARGE TYPE MOWER APPARATUS HAVING A PAIR OF AUXILIARY PLATES FOR DIRECTING GRASS TO A DISCHARGE OPENING

CROSS REFERENCE TO RELATED APPLICATIONS

This application is a divisional of U.S. application Ser. No. 11/515,496, filed Sep. 1, 2006 now U.S. Pat. No. 7,735,306, which claims the benefit of Japanese Patent Applications Nos. 2005-284402 and 2006-004926 filed on Sep. 29, 2005 and Jan. 12, 2006, respectively.

BACKGROUND OF THE INVENTION

1. Field of the Invention

The present invention relates to a rear discharge type mower apparatus.

2. Description of Related Art

Figure 2:
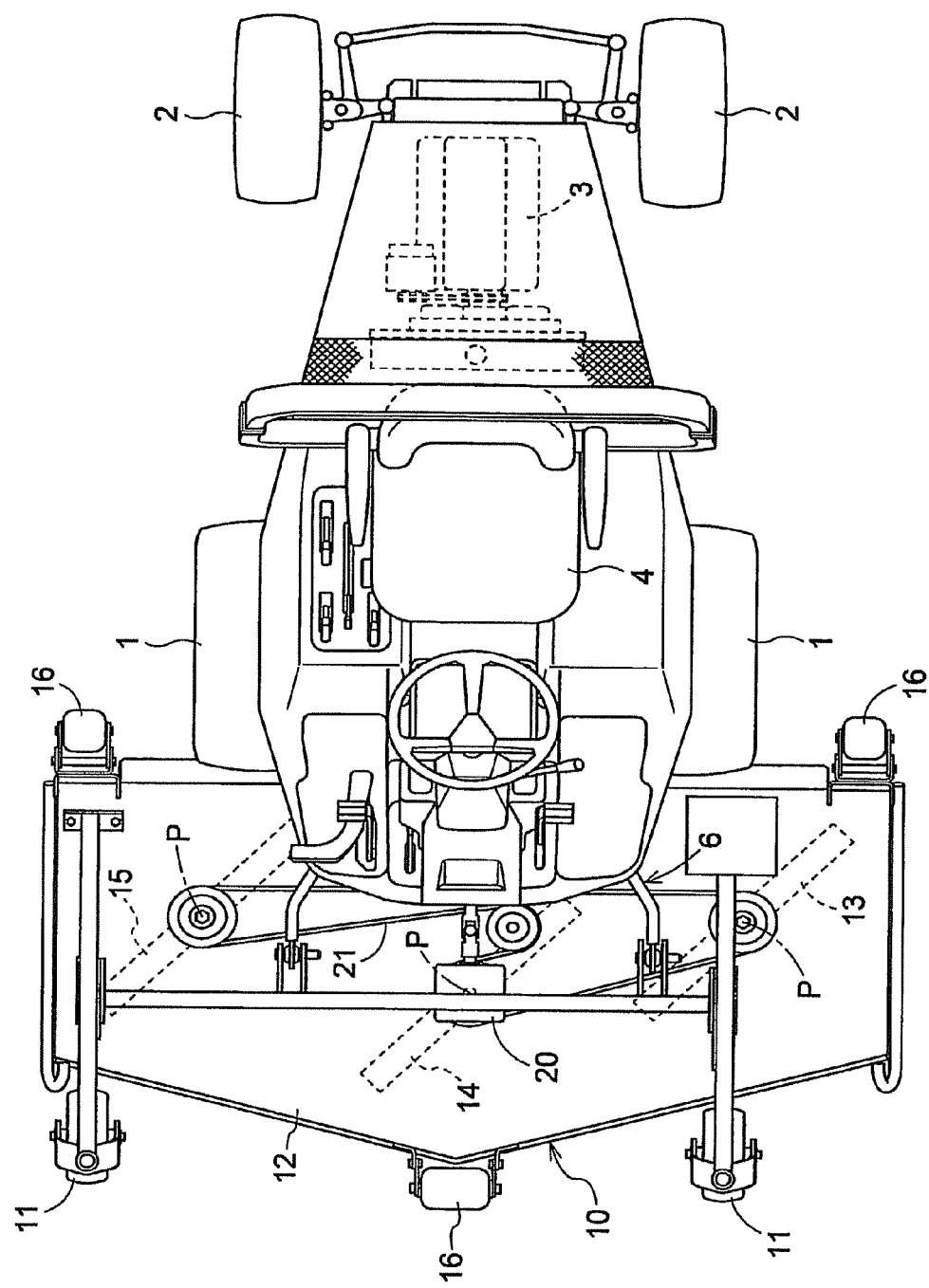

Conventional examples of the mower apparatus include a mower apparatus that is described in JP H01-25547A (third and forth sections, FIG. 2). The unit disclosed herein is provided with a guide plate 22 for guiding mowed grass that has been mowed with a cutting blade member 7 (a rotating blade) so as to discharge the mowed grass to the rear. The guide plate 22 is constituted by a planer arc portion 23 that encloses the outer circumference portion of a rotational locus of the cutting blade member 7, and a linear guide portion 24 that is circumscribed about the arc portion 23 on the same axis as that of the rotational locus of the cutting blade member 7. The guide plate 22 is positioned outside a mowing process area of the cutting blade member 7 when viewed from above or below a mower deck 10 (a cutting blade housing) throughout the entire guide plate 22. The linear guide portion 24 of the guide plate 22 is inclined with respect to the fore-and-aft direction of the mower deck 10 (a cutting blade housing).

In the conventional mower apparatus described above, the guide plate is positioned outside a rotation area of the rotating blade. In order to precisely discharge mowed grass to the rear, it is necessary to include a rotating blade with a high wind-generating ability such that wind generated by rotation of the rotating blade is strong and thus easily flows along the guide plate.

SUMMARY OF THE INVENTION

In one embodiment, a rear discharge type apparatus includes a blade housing having a top plate, a front wall and at least one side wall. A support shaft supported by the blade housing extends vertically. A rotatable blade is supported by the support shaft and a tip end of the blade forms a rotation path. A front guide plate is located rearwardly of the front wall and has a shape extending substantially along the rotation path of a corresponding blade forming an opening for ejecting cut grass rearwardly. The front guide plate has a downstream plate portion located in a downstream position with respect to a rotating direction of the corresponding blade and has an end defining one end of the opening. The downstream plate portion extends rearwardly of the blade housing such that cut grass transported by discharged wind that has been generated by the corresponding blade is moved away from an adjacent blade. A distance from a center of rotation to the downstream plate portion is progressively decreased toward a rear end of the blade housing, and at least a part of the downstream plate portion is located radially inside of the rotation path of the corresponding blade. A lower edge of the downstream plate is closer to the top plate than the corresponding blade.

In a further embodiment, a rear discharge type mower apparatus includes a blade housing having a top plate, a front wall and at least one side wall. At least two support shafts are supported by the blade housing and extend vertically. A rotatable blade is supported by the support shaft and a tip end of the blade forms a rotation path. A first front guide plate and a second front guide plate are located rearwardly of the front wall and have a shape extending substantially along a rotation path of a corresponding blade. A first auxiliary plate extends straight from a rear end connecting the first front guide plate to the second front guide plate through a region radially inside the rotation path of the corresponding blade to a rear region of the blade housing. A second auxiliary plate extends from a forward region of the second front guide plate through a region radially inside the rotation path of the corresponding blade to a rear region of the blade housing. The second auxiliary plate includes a curved portion and a linear portion extending rearwardly of the curved portion. The linear portion and the first auxiliary plate extend parallel to each other and have openings formed by rearward ends thereof and opposed to a mowed grass discharge opening, respectively. Lower edges of the first and second auxiliary plates are closer to the top plate than the corresponding blade.

BRIEF DESCRIPTION OF THE DRAWING(S)

Figure 1:
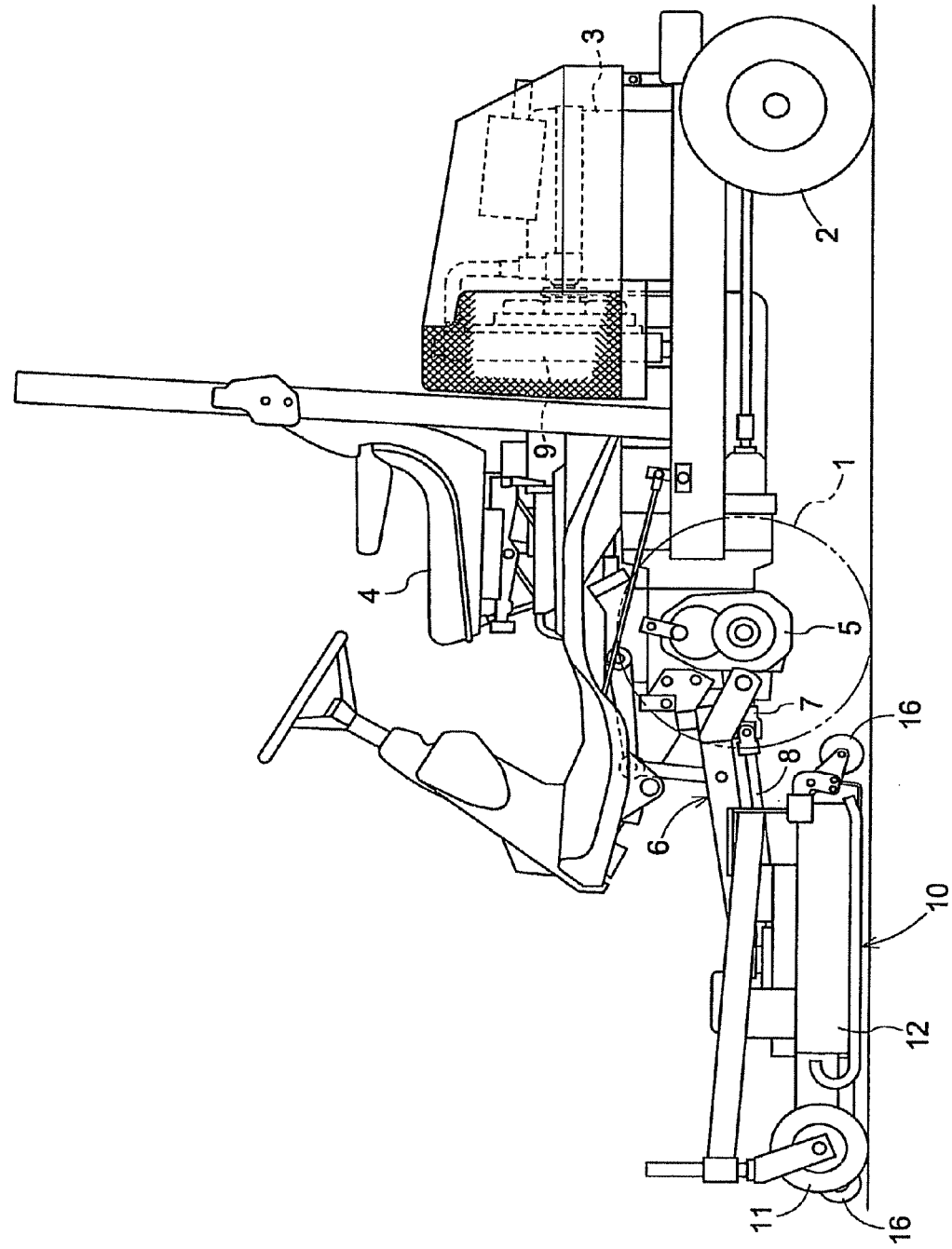
Figure 3:
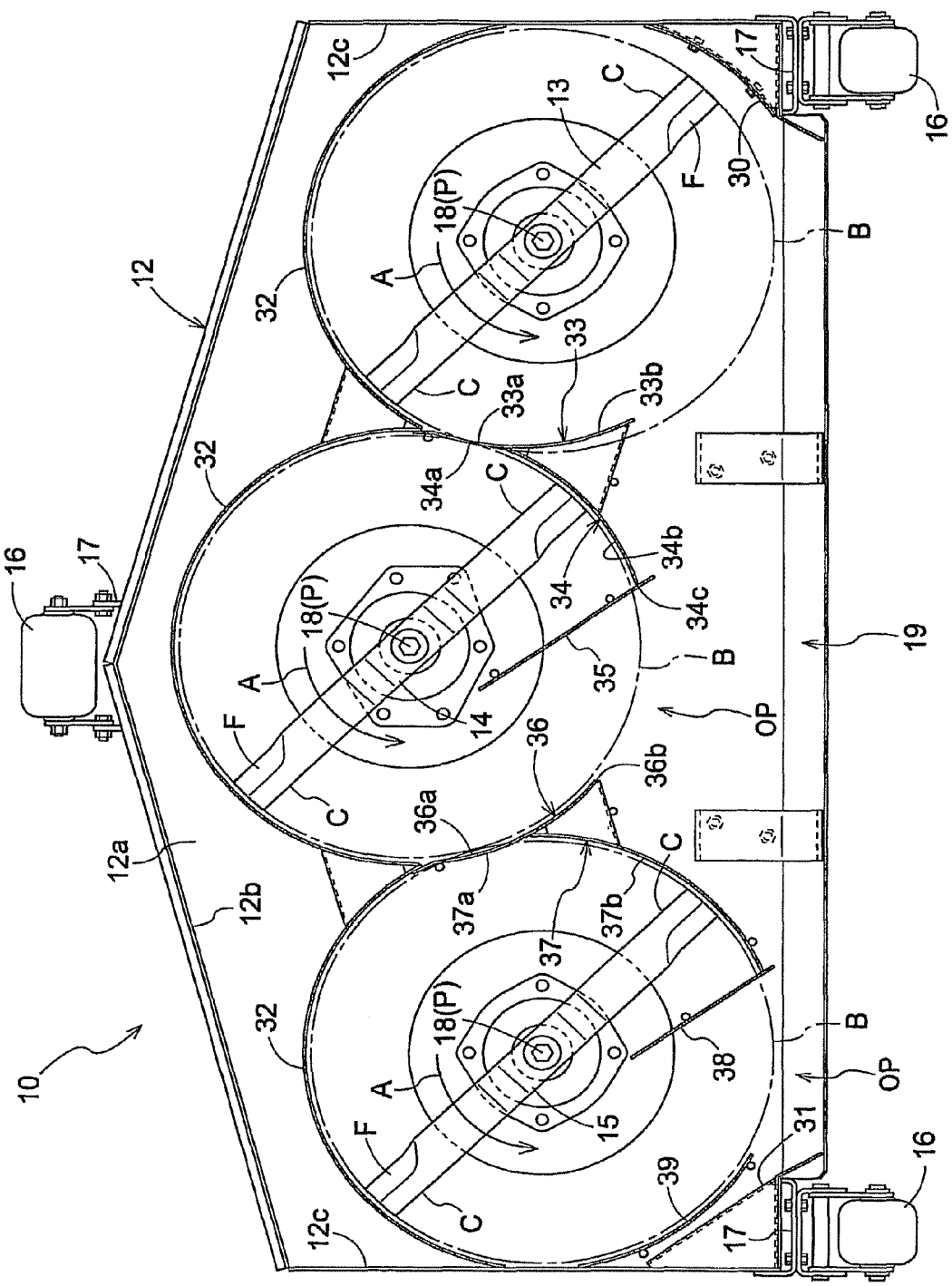
Figure 4:
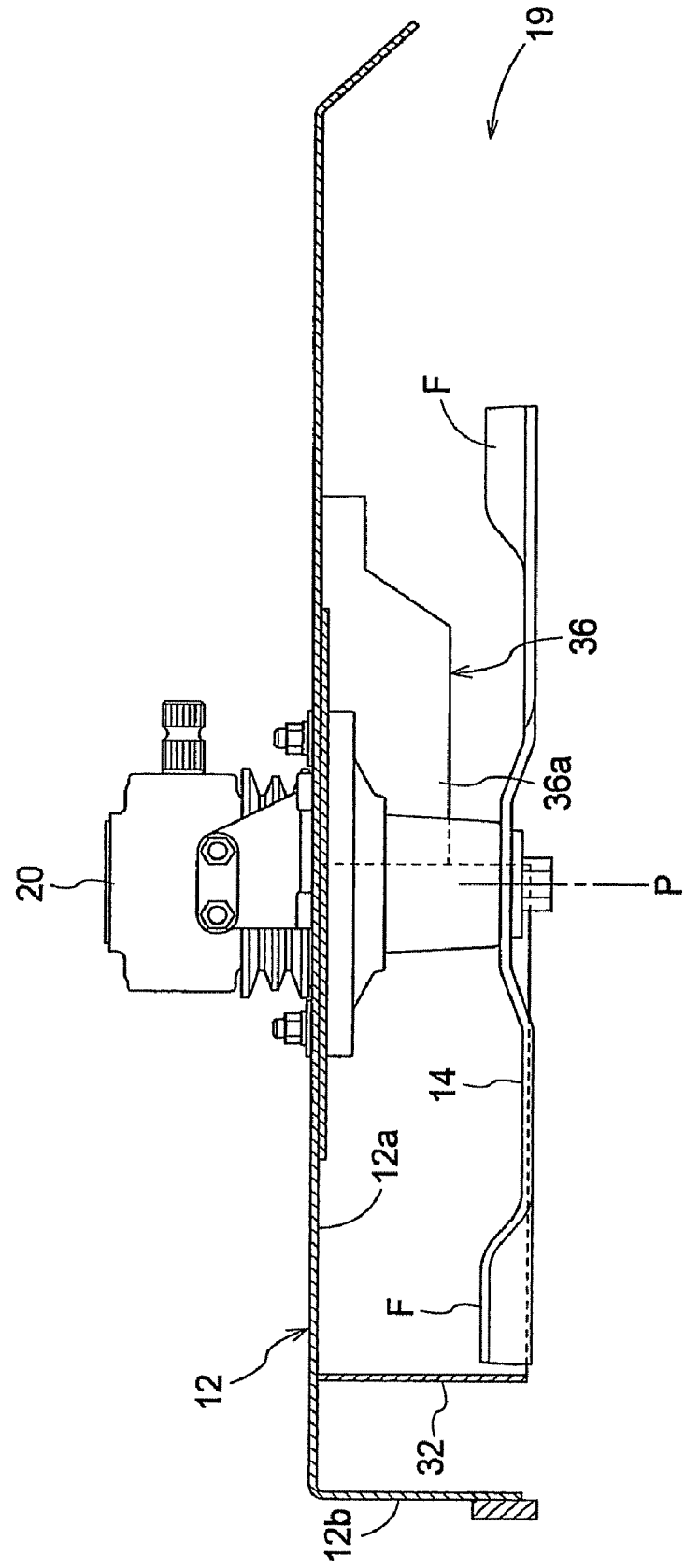
Figure 5:
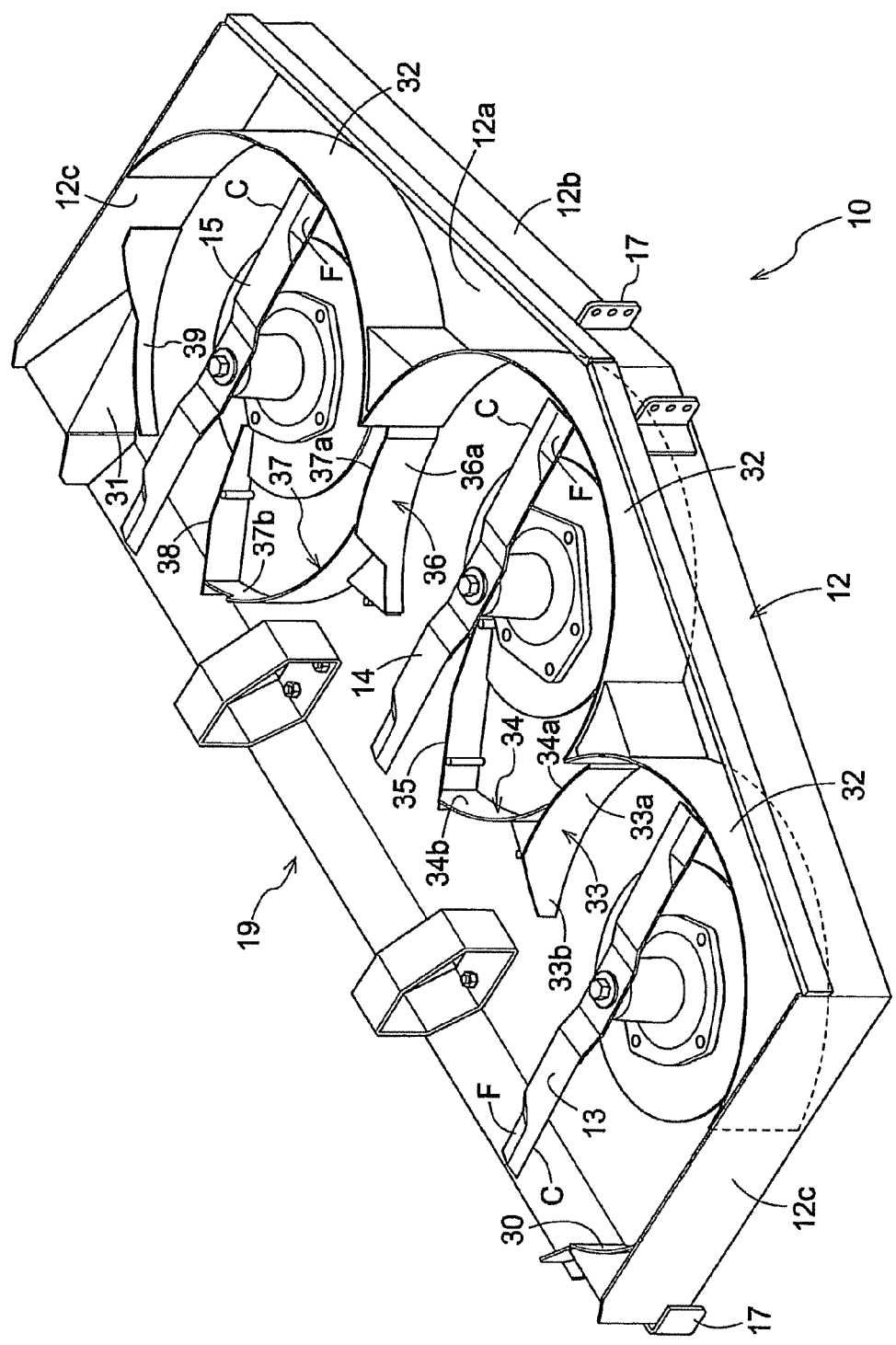
Figure 6:
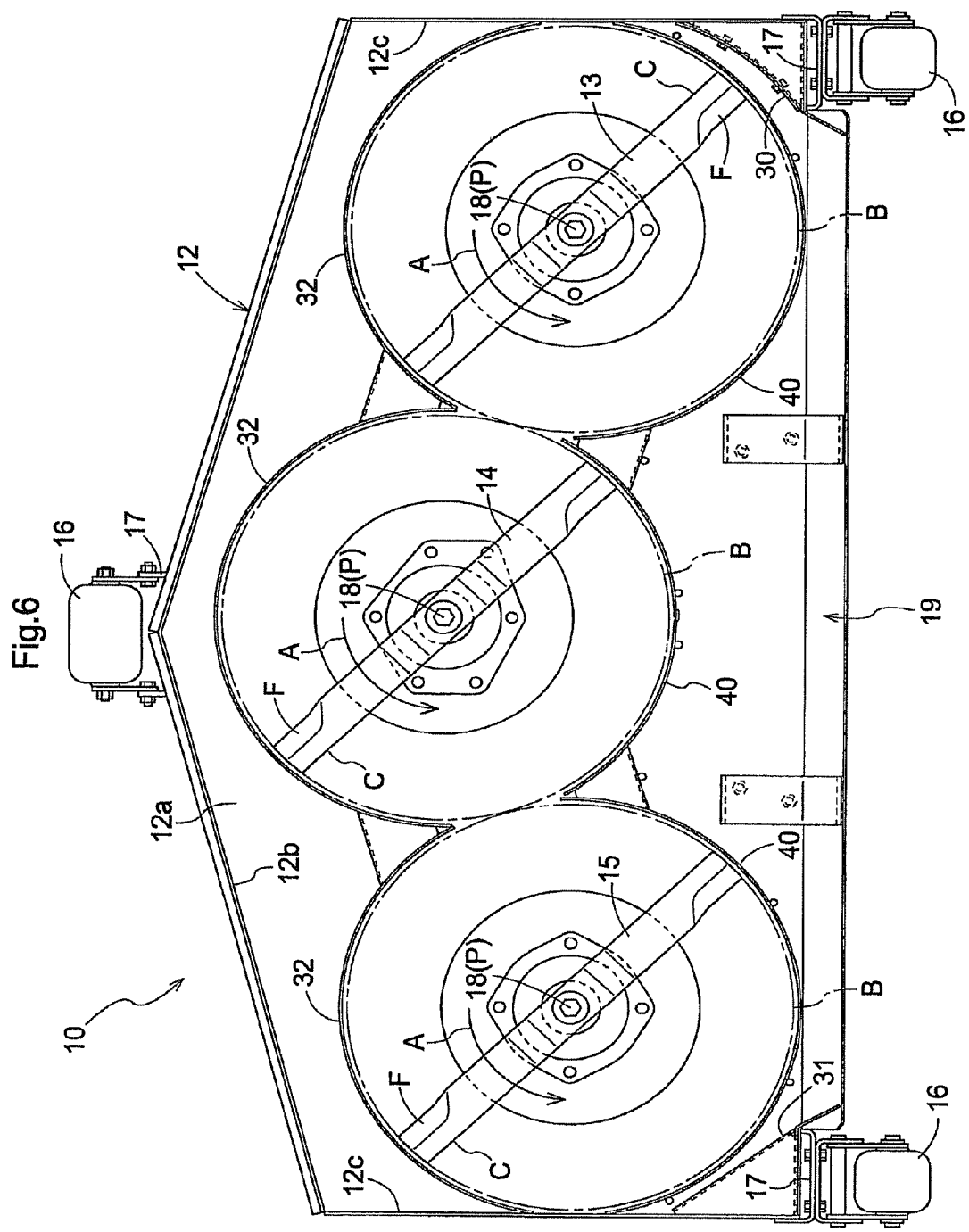
Figure 7:
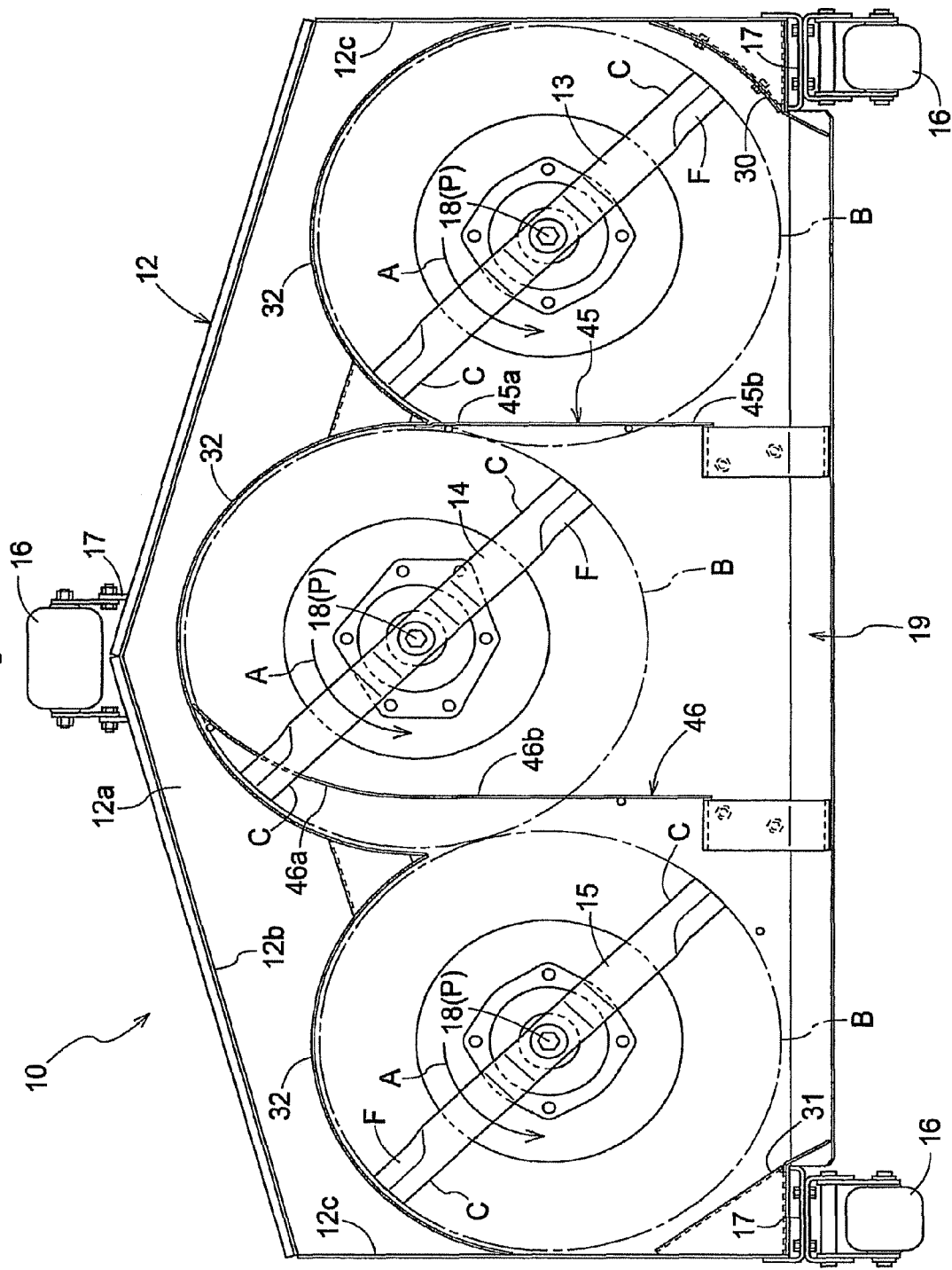
Figure 8:
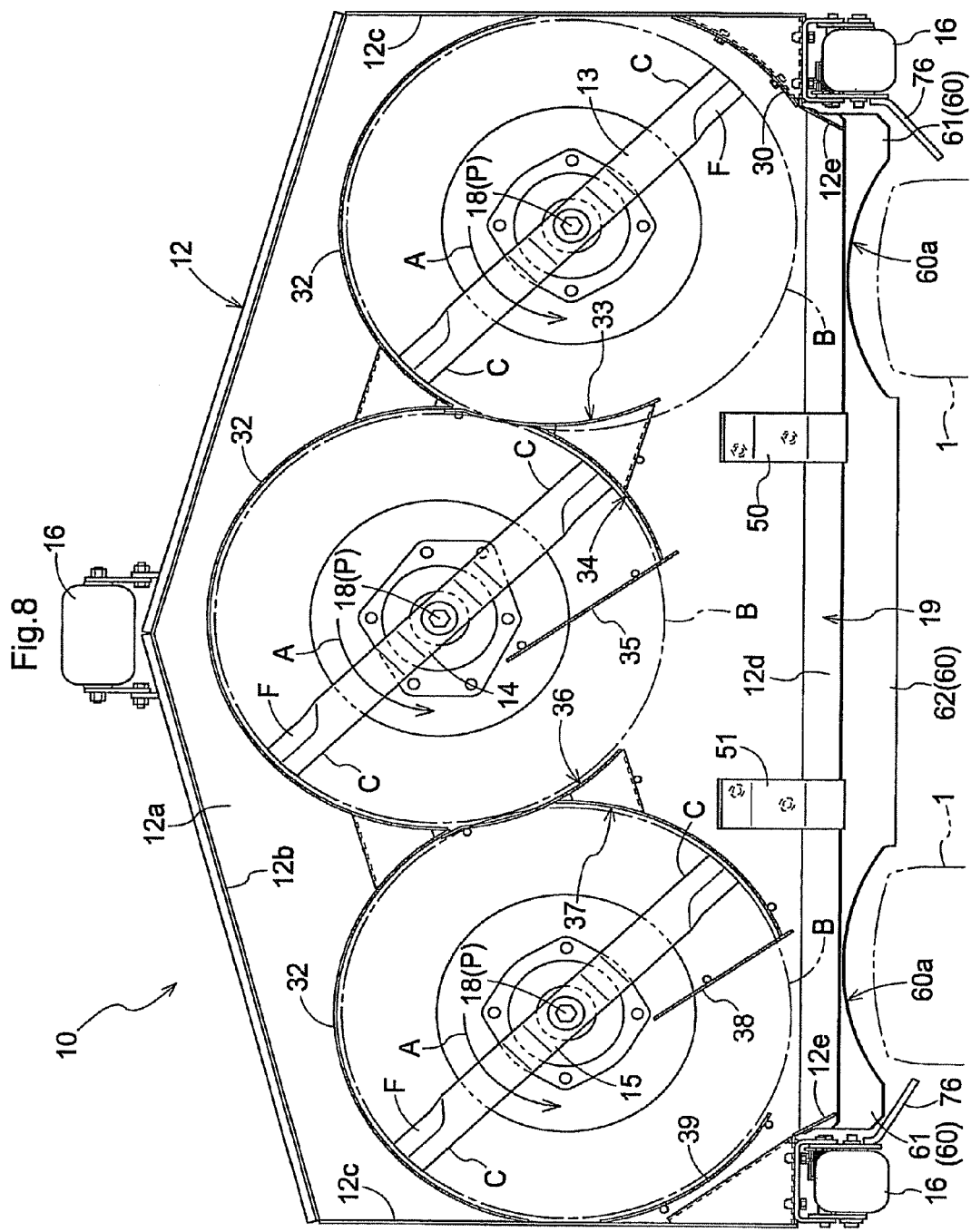
Figure 9:
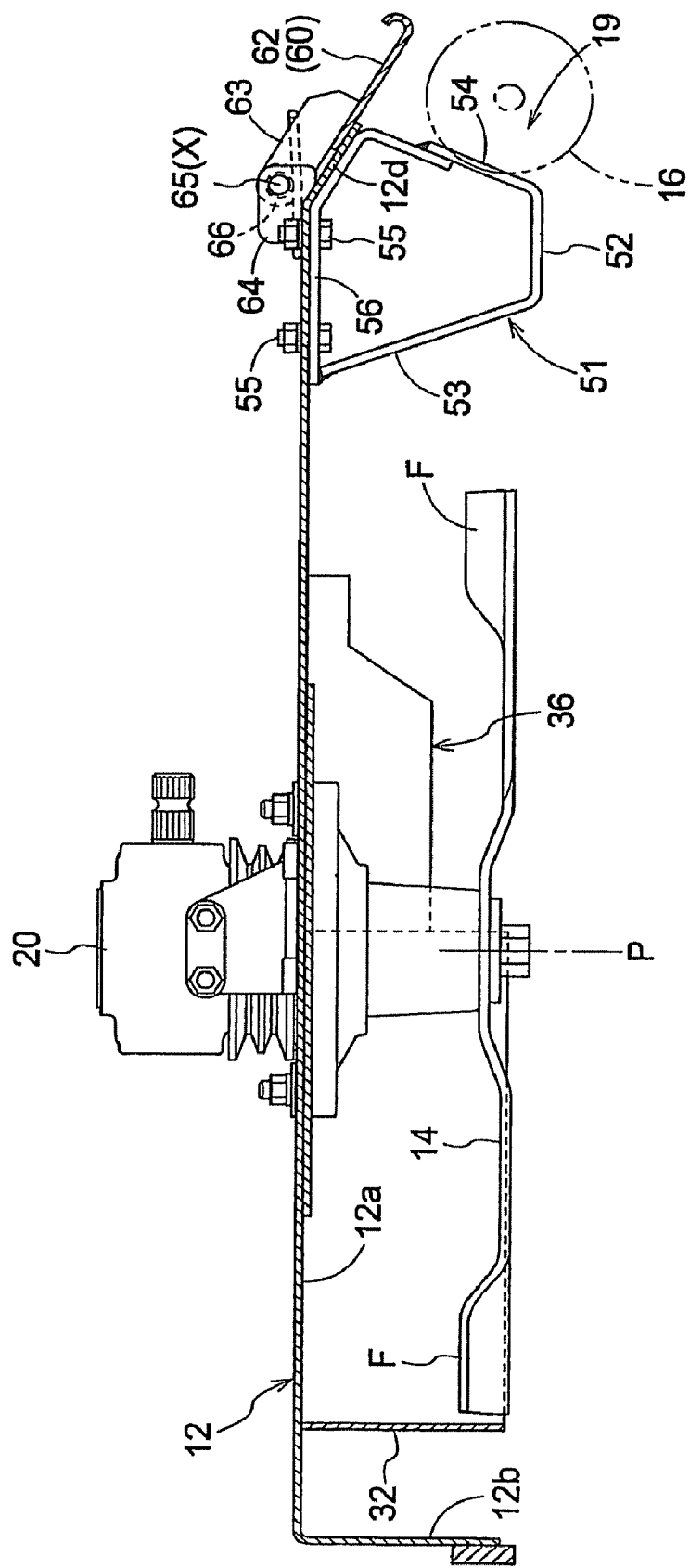
Figure 10:
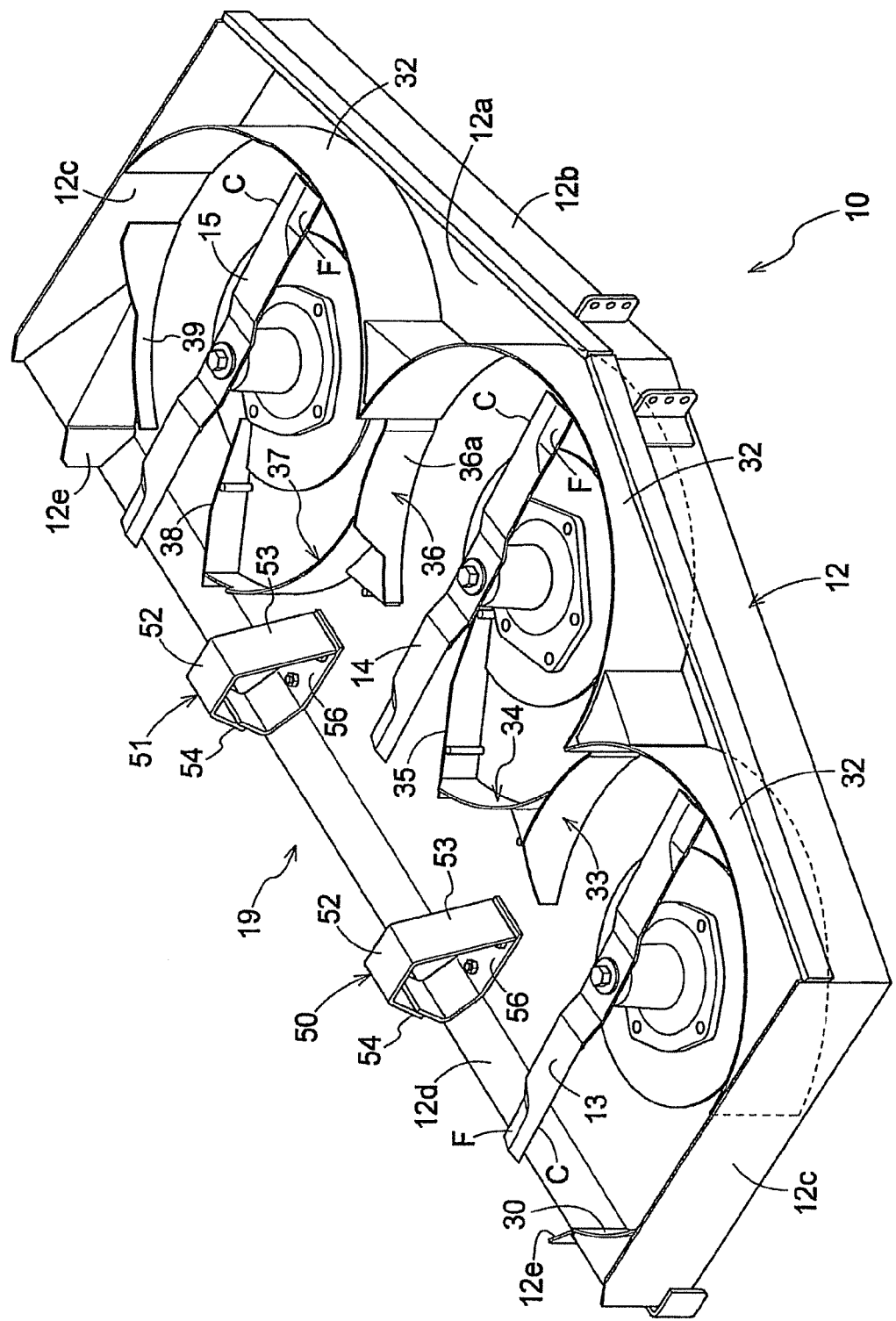
Figure 11:
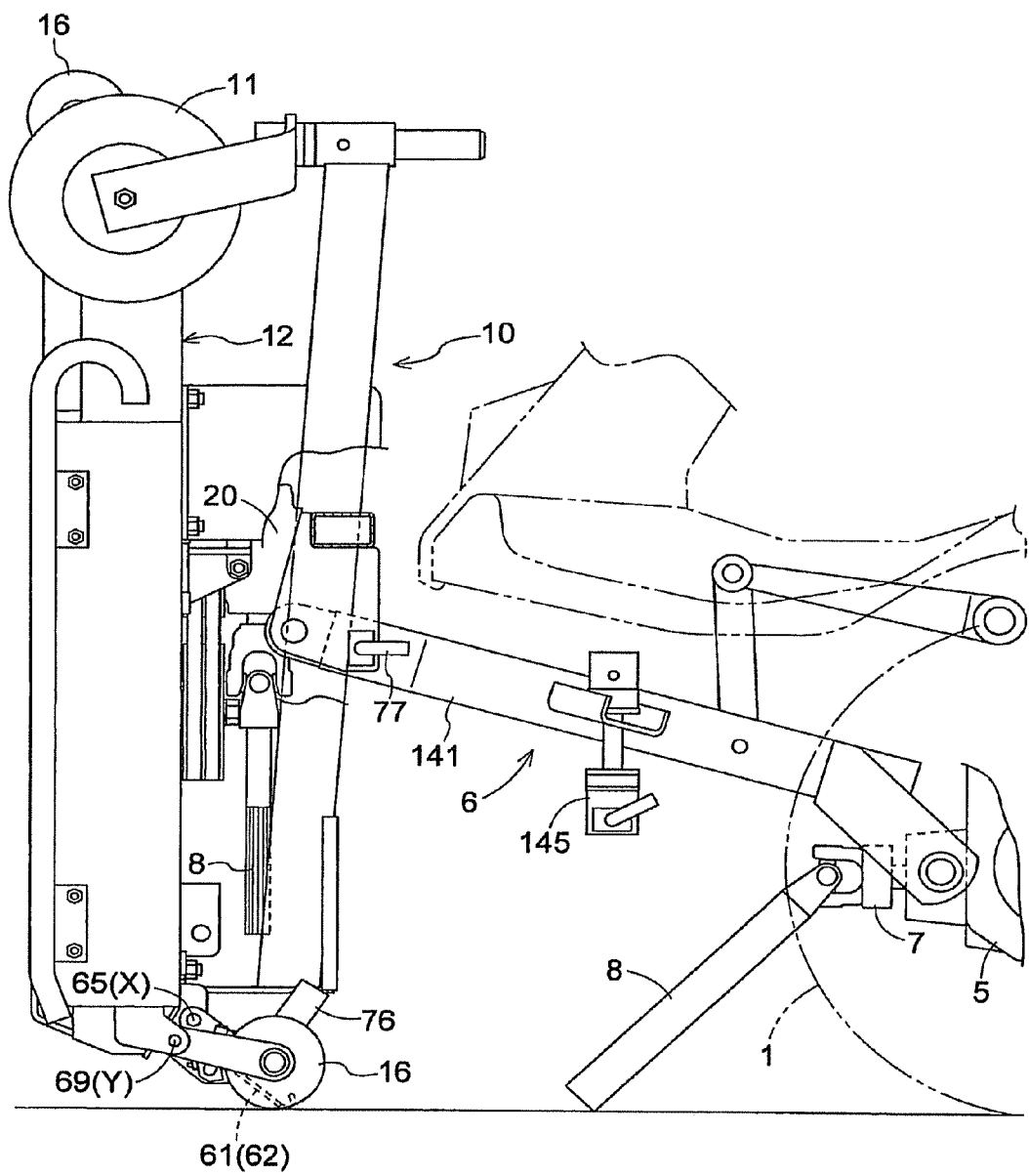
Figure 13:
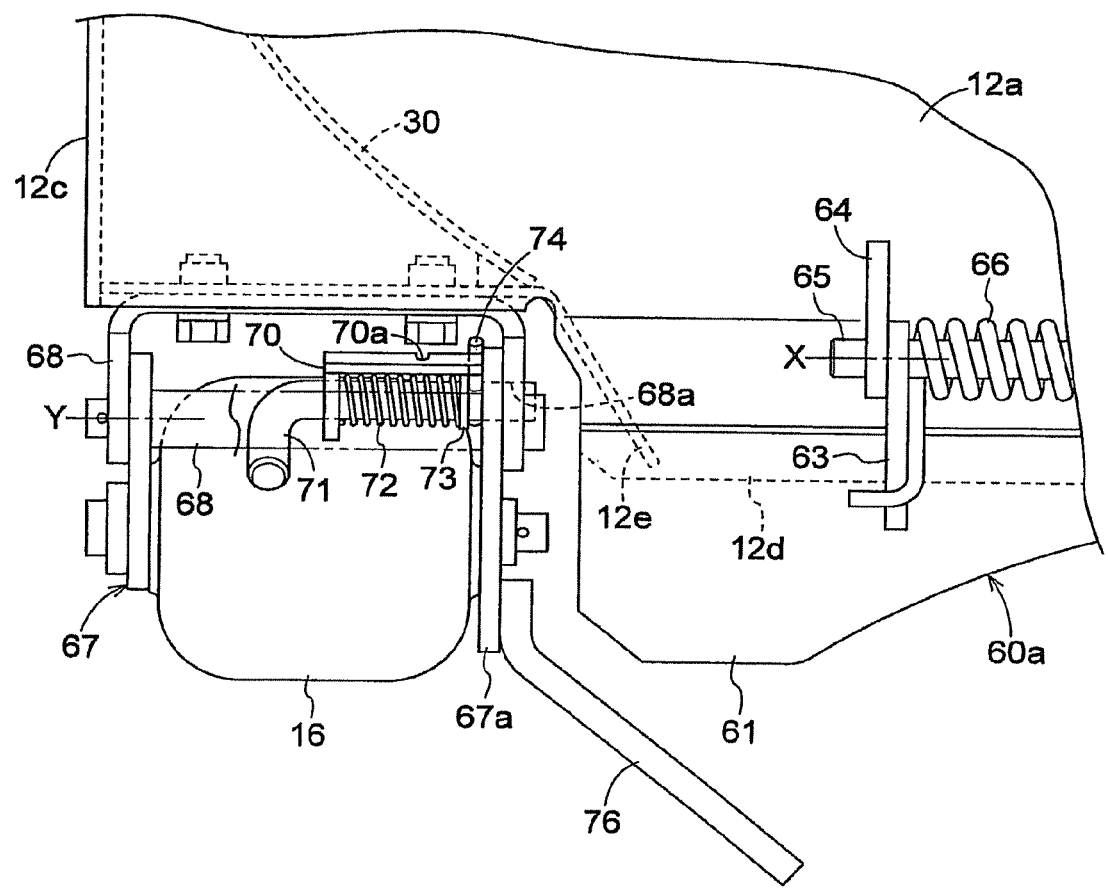

FIG. 1 is a side view of an entire riding type mower;
FIG. 2 is a plan view of the entire riding type mower;
FIG. 3 is a bottom view of a mower apparatus;
FIG. 4 is a cross-sectional view of an arrangement section of a center rotating blade of the mower apparatus;
FIG. 5 is a perspective view of the mower apparatus;
FIG. 6 is a bottom view of the mower apparatus with rear guide plates are attached;
FIG. 7 is a bottom view of the mower apparatus in a second embodiment;
FIG. 8 is a bottom view of the mower apparatus;
FIG. 9 is a side view showing the ground contacting slider;
FIG. 10 is a perspective view showing the bottom side of the mower apparatus;
FIG. 11 is a side view showing the mower apparatus in its erect position;
FIG. 12A is a side view showing the rear roller in its locked position;
FIG. 12B is a side view showing the roller in its unlocked position; and
FIG. 13 is a plan view showing the roller.

DESCRIPTION OF THE PREFERRED EMBODIMENTS

Hereinafter, embodiments of the present invention are described based on the drawings.

While a number of embodiments are described below, it is to be understood that one or more features in one embodiment may be combined with one or more features in other embodiments without falling out of the scope of the present invention. Also, while terms such as a "guide plate" and a "partition plate" are used in the specification, they do not necessarily represent an independent component. For example, two guide plates (or one guide plate and one partition plate) may function as one guide plate and thus may be called a guide plate.

In a first embodiment, as shown in FIGS. 1 and 2, a riding type mower is configured such that: a mower apparatus 10 is connected via a link mechanism 6 to a front transmission case 5 constituting the front portion of a frame of a self-propelled chassis, wherein the chassis is provided with a pair of left and right front wheels 1 that can be driven, a pair of left and right rear wheels 2 that can be steered, a drive portion that includes an engine 3 in the rear portion of the chassis, and a driving portion that includes a driving seat 4 in front of this drive portion; and drive force from the engine 3 is transmitted from a power take-off shaft 7 provided in the front transmission case 5 via a rotating shaft 8 to the mower apparatus 10.

This mower is for mowing lawn or grass. When an elevation cylinder (not shown) that is provided inside the front transmission case 5 is extended and contracted in conjunction with the link mechanism 6, the link mechanism 6 is swung up and down with respect to the front transmission case 5, and vertically moves the mower apparatus 10 between a lowered operation state in which contact gauge wheels 11 are in contact with the ground surface and an raised non-operation state in which the contact gauge wheels 1 have been raised off the ground surface. When the self-propelled chassis travels while the mower apparatus 10 is in the lowered operation state, the mower apparatus 10 mows lawn or grass with a plurality of rotating blades 13, 14, and 15 that are driven to rotate inside a cutting blade housing 12.

Describing the mower apparatus 10 in more detail, as shown in FIGS. 3, 4, and 5, the mower apparatus 10 includes, for example: the cutting blade housing 12 that has brackets 17 to which rollers 16 for surmounting obstacles are rotatively attached, at the lateral-center portion on the front end side, and the lateral-end portions on the rear end side; rotating shafts 18 that extend downward in the cutting blade housing, from a plurality of locations that are arranged in the lateral direction in the cutting blade housing, on a top plate 12a of the cutting blade housing 12, toward the internal portion of the cutting blade housing 12; and the rotating blades 13, 14, and 15 that are supported by the lower end portions of the rotating shafts 18 so as to rotate together therewith.

The cutting blade housing 12 includes: the top plate 12a; a front wall plate 12b that extends downward in the cutting blade housing from the mountain-shaped front edge portion of the top plate 12a; and side wall plates 12c that extend downward in the cutting blade housing from the left and right side edge portions of the top plate 12a. The rear portion of the cutting blade housing 12 is provided with a mowed grass discharge port 19 that is defined by the rear edge portion of the top plate 12a and the rear end portions of rear guide plates 30 and 31 positioned at the lateral-end portions on the rear end side inside the cutting blade housing, substantially throughout the entire lateral width of the cutting blade housing 12.

The rotating support shaft 18 that supports the center rotating blade 14 positioned at the center portion in the lateral width direction in the cutting blade housing among the plurality of rotating blades 13, 14, and 15 is moved in conjunction with an input gear mechanism 20 (see FIG. 2) that is positioned on the upper face side on the top plate 12a of the cutting blade housing 12. The rotating shafts 18 of all of the rotating blades 13, 14, and 15 are moved in conjunction with a transmission belt 21 (see FIG. 2) at portions projecting toward the upper face of the top plate 12a of the cutting blade housing 12. The drive force from the rotating shaft 8 is transmitted by the input gear mechanism 20 toward the upper end of the rotating support shaft 18 of the center rotating blade 14. The drive force of the rotating support shaft 18 is transmitted via the transmission belt 21 toward the upper ends of the rotating shafts 18 of the side rotating blades 13 and 15 positioned on the laterally outer side in the cutting blade housing among the plurality of rotating blades 13, 14, and 15. Accordingly, the rotating shafts 18 are driven to rotate, and thus the rotating blades 13, 14, and 15 are driven so as to rotate in rotation directions A shown in FIG. 3 about axes P of the rotating shafts 18 that are vertical in the cutting blade housing.

As shown in FIGS. 3 and 5, the internal portion of the cutting blade housing 12 is provided with: front guide plates 32 that are arranged in front of and close to rotation areas B (an area enclosed by the rotation path formed with the tip end of each of the rotating blades 13, 14, and 15) of the rotating blades 13, 14, and 15; a guide plate 33 (downstream plate portion) for the side blade that is disposed behind, with respect to the cutting blade housing, the end portion of the front guide plate 32 on the side where the center rotating blade 14 is positioned, wherein this front guide plate 32 corresponds to the side rotating blade 13 that is one of the pair of side rotating blades 13 and 15; a curved partition plate 34 that is disposed behind, with respect to the cutting blade housing, the end portion of the front guide plate 32 on the side where the guide plate 33 is positioned, wherein this front guide plate 32 corresponds to the center rotating blade 14; a linear guide plate 35 (auxiliary plate) that has one end connected to the rear end (first end) 34c of the curved partition plate 34; a guide plate 36 for the center blade that is disposed behind, with respect to the cutting blade housing, the end portion of the front guide plate 32 on the side opposite to the side where the curved partition plate 34 is positioned, wherein this front guide plate 32 corresponds to the center rotating blade 14; a curved partition plate 37 that is disposed behind, with respect to the cutting blade housing, the end portion of the front guide plate 32 on the side where the guide plate 36 (with a second end 36b) is positioned, wherein this front guide plate 32 corresponds to the side rotating blade 15 that is the other of the pair of side rotating blades 13 and 15; a linear guide plate 38 (auxiliary plate) that has one end connected to the rear end of the curved partition plate 37; a rear curved guide plate 39 that is disposed behind, with respect to the cutting blade housing, the end portion of the front guide plate 32 on the side opposite to the side where the curved partition plate 37 is positioned, wherein this front guide plate 32 corresponds to the other side rotating blade 15; the rear guide plate 30 that is disposed outside, in the rear and lateral direction, the rotation area B of the one side rotating blade 13; and the rear guide plate 31 that is disposed outside, in the rear and lateral direction, the rotation area B of the other side rotating blade 15. The first end 34c and the second end 36b define an opening OP that opens rearwardly for ejecting cut grass rearwardly.

The front guide plates 32, the guide plates 33, 35, 36, 38, and the partition plates 34 and 37 are made of band plates, and supported on the lower face of the top plate 12a such that the lateral width direction of the band plates is vertical in the cutting blade housing and such that the lateral width of the band plates is projected downward in the cutting blade housing from the top plate 12a of the cutting blade housing 12.

As shown in FIGS. 3 and 5, the front guide plates 32 are formed in the shape of arcs along the outer circumferences of the rotation areas B of the side rotating blades 13 and 15 and the center rotating blade 14, in front of and close to the rotation areas B when viewed from above or below the cutting blade housing. The front guide plates 32 are configured such that: the end portions of the pair of adjacent front guide plates 32 and 32 are formed in a continuous line; and the lower ends of the front guide plates 32 are arranged at an above-ground height substantially equal to that of the rotating blades 13, 14, and 15 as shown in FIG. 4.

The guide plate 33 (downstream plate portion) corresponding to the one side rotating blade 13 is disposed at a higher position than the one side rotating blade 13 throughout the entire guide plate 33. The guide plate 33 is formed in the shape of an arc when viewed from above or below the cutting blade housing. A front end portion 33a, in the fore-and-aft direction in the cutting blade housing, of the guide plate 33 is positioned outside and close to the rotation area B of the one side rotating blade 13. A rear end portion 33b, in the fore-and-aft direction in the cutting blade housing, of the guide plate 33 is disposed so as to enter the rotation area B of the one side rotating blade 13 when viewed from above or below the cutting blade housing. Thus, the guide plate 33 guides discharged wind that has been generated by wind-generating vanes F positioned on the rear sides on blade portions C on both ends of the side rotating blade 13, and mowed grass that is transported by this discharged wind such that they hardly leak toward the center rotating blade 14 and such that they flow toward the rear in the cutting blade housing.

The guide plate 36 corresponding to the center rotating blade 14 is disposed at a higher position than the center rotating blade 14 throughout the entire guide plate 36. The guide plate 36 is formed in the shape of an arc when viewed from above or below the cutting blade housing. The entire guide plate 36 is along the outer circumference of the rotation area B of the center rotating blade 14 and is disposed outside and close to the rotation area B. Thus, the guide plate 36 guides discharged wind that has been generated by wind-generating vanes F positioned on the rear sides on blade portions C on both ends of the center rotating blade 14, and mowed grass that is transported by this discharged wind such that they hardly leak toward the side rotating blade 15 and such that they flow toward the rear in the cutting blade housing.

The curved partition plate 34 corresponding to the center rotating blade 14 includes a front end portion 34a that also serves as the front end portion 33a of the guide plate 33, and a rear end portion 34b that has a front end connected to the front end portion 34a and that is formed in the shape of an arc when viewed from above or below the cutting blade housing. The curved partition plate 34 is disposed at a higher position than the center rotating blade 14 throughout the entire portion thereof. Furthermore, the front end portion 34a of the curved partition plate 34 is disposed between the rotation area B of the one side rotating blade 13 and the rotation area B of the center rotating blade 14. The rear end portion 34b of the curved partition plate 34 is along the outer circumference of the rotation area B of the center rotating blade 14 and is disposed outside and close to the rotation area B. Accordingly, the curved partition plate 34 partitions off the rotation area B of the center rotating blade 14 such that wind that has been generated by the wind-generating vanes F of the center rotating blade 14 hardly leaks out of the rotation area B.

The linear guide plate 35 corresponding to the center rotating blade 14 is formed in the shape of a straight line when viewed from above or below the cutting blade housing, and is disposed at a higher position than the center rotating blade 14 in the rotation area B of the center rotating blade 14 substantially throughout the entire linear guide plate 35. The linear guide plate 35 linearly extends toward the front in the cutting blade housing, from the rear end side of the curved partition plate 34 in the fore-and-aft direction in the cutting blade housing, toward the inner portion of the rotation area B of the center rotating blade 14, and is disposed so as to guide mowed grass such that it flows toward the rear in the cutting blade housing.

The curved partition plate 37 corresponding to the other side rotating blade 15 includes a front end portion 37a that also serves as a front end portion 36a of the guide plate 36 corresponding to the center rotating blade 14, and a rear end portion 37b that has a front end connected to the front end portion 37a and that is formed in the shape of an arc when viewed from above or below the cutting blade housing. The curved partition plate 37 is disposed at a higher position than the side rotating blade 15 throughout the entire portion thereof. Furthermore, the front end portion 37a of the curved partition plate 37 is along the outer circumference of the rotation area B of the center rotating blade 14 and is disposed outside and close to the rotation area B of the center rotating blade 14. The rear end portion 37b of the curved partition plate 37 is along the outer circumference of the rotation area B of the side rotating blade 15 and is disposed outside and close to the rotation area B. Accordingly, the curved partition plate 37 partitions off the rotation area B of the side rotating blade 15 from the rotation area B of the center rotating blade 14 such that wind that has been generated by the wind-generating vanes F of the side rotating blade 15 hardly leaks out of the rotation area B.

The linear guide plate 38 corresponding to the other side rotating blade 15 is formed in the shape of a straight line when viewed from above or below the cutting blade housing, and is disposed at a higher position than the side rotating blade 15 in the rotation area B of the side rotating blade 15 substantially throughout the entire linear guide plate 38. The linear guide plate 38 linearly extends toward the front in the cutting blade housing, from the rear end side of the curved partition plate 37 in the fore-and-aft direction in the cutting blade housing, toward the inner portion of the rotation area B of the side rotating blade 15, and is disposed so as to guide mowed grass such that it flows toward the rear in the cutting blade housing.

The rear curved guide plate 39 is formed in the shape of an arc when viewed from above or below the cutting blade housing. The entire rear curved guide plate 39 is along the rotation area B of the side rotating blade 15 and is disposed outside and close to the rotation area B, so as to guide mowed grass such that it flows toward the rear in the cutting blade housing.

Briefly describing, the mower apparatus 10 is configured as a rear discharge type mower apparatus: that is provided with the rotating blades 13, 14, and 15 that can be driven to rotate in the rotation directions A about the axes P that are vertical in the cutting blade housing, at a plurality of locations that are arranged in the lateral direction in the cutting blade housing, inside the cutting blade housing 12; that mows lawn or grass with the rotating blades 13, 14, and 15 that rotate; and that discharges mowed lawn or grass (hereinafter, simply referred to as "mowed grass") through the mowed grass discharge port 19 in the rear portion of the cutting blade housing to the rear of the cutting blade housing 12 with discharged wind that has been generated by rotation of the wind-generating vanes F of the rotating blades 13, 14, and 15.

More specifically, the rotating blades 13, 14, and 15 are driven to rotate in the rotation directions A about the axes P of the rotating shafts 18 that are vertical in the cutting blade housing, by the drive force of the rotating shafts 18. Lawn or grass that has entered the rotation areas B of the rotating blades 13, 14, and 15 as the self-propelled chassis travels is mowed with the pair of blade portions C of the rotating blades 13, 14, and 15. The one side rotating blade 13 is driven to rotate so as to move from the front end side to the rear end side of the guide plate 33 with respect to the guide plate 33. The center rotating blade 14 is driven to rotate so as to move from the rear end side to the front end side of the curved partition plate 34 with respect to the curved partition plate 34. The other side rotating blade 15 is driven to rotate so as to move from the rear end side to the front end side of the curved partition plate 37 with respect to the curved partition plate 37. At that time, the rotating blades 13, 14, and 15 generate discharged wind with the wind-generating vanes F positioned on the rear sides on the blade portions C on both ends of the rotating blades 13, 14, and 15.

Discharged wind that has been generated by the wind-generating vanes F of the one side rotating blade 13 flows so as to rotate in the rotation direction A of the side rotating blade 13 in the rotation area B of the side rotating blade 13, by being guided by the rear guide plate 30, the front guide plate 32, and the guide plate 33, and being suppressed by the guide plate 33 from leaking toward the center rotating blade 14. In the rear portion of the rotation area B, the discharged wind flows from a portion between the rear guide plate 30 and the guide plate 33 toward the mowed grass discharge port 19, and then flows out through the mowed grass discharge port 19 to the rear of the cutting blade housing 12. Mowed grass that has been mowed with the side rotating blade 13 is transported by discharged wind that has been generated by the side rotating blade 13, guided by the guide plates 30, 32, and 33, and then discharged through the mowed grass discharge port 19 to the rear of the cutting blade housing 12.

Discharged wind that has been generated by the wind-generating vanes F of the center rotating blade 14 flows so as to rotate in the rotation direction A of the center rotating blade 14 in the rotation area B of the center rotating blade 14, by being guided by the curved partition plate 34, the front guide plate 32, and the guide plate 36, being suppressed by the curved partition plate 34 from leaking toward the side rotating blade 13, and being suppressed by the guide plate 36 from leaking toward the side rotating blade 15. In the rear portion of the rotation area B, the discharged wind flows from a portion between the rear ends of the linear guide plate 35 and the guide plate 36 toward the mowed grass discharge port 19 by being guided by the linear guide plate 35 and the guide plate 36 toward the rear in the cutting blade housing, and then flows out through the mowed grass discharge port 19 to the rear of the cutting blade housing 12. Mowed grass that has been mowed with the center rotating blade 14 is transported by discharged wind that has been generated by the center rotating blade 14, guided by the guide plates 32, 35, and 36, and the partition plate 34, and then discharged through the mowed grass discharge port 19 to the rear of the cutting blade housing 12.

Discharged wind that has been generated by the wind-generating vanes F of the other side rotating blade 15 flows so as to rotate in the rotation direction A of the side rotating blade 15 in the rotation area B of the side rotating blade 15, by being guided by the curved partition plate 37, the front guide plate 32, and the rear curved guide plate 39, and being suppressed by the curved partition plate 37 from leaking toward the center rotating blade 14. In the rear portion of the rotation area B, the discharged wind flows from a portion between the rear ends of the linear guide plate 38 and the rear curved guide plate 39 toward the mowed grass discharge port 19 by being guided by the linear guide plate 38 and the rear curved guide plate 39 toward the rear in the cutting blade housing, and then flows out through the mowed grass discharge port 19 to the rear of the cutting blade housing 12. Mowed grass that has been mowed with the side rotating blade 15 is transported by discharged wind that has been generated by the side rotating blade 15, guided by the partition plate 37, and the guide plates 32 and 39, and then discharged through the mowed grass discharge port 19 to the rear of the cutting blade housing 12.

The cutting blade housing 12 is configured such that as shown in FIG. 6, rear guide plates 40 corresponding to the rotating blades 13, 14, and 15 can be attached instead of the guide plates 33 and 36, the curved partition plates 34 and 37, and the linear guide plates 35 and 38.

The rear guide plates 40 are formed in the shape of arcs along the outer circumferences of the rotation areas B of their corresponding rotating blades 13, 14, and 15, behind and close to the rotation areas B. The rear guide plates 40 are arranged at a higher position than the rotating blades 13, 14, and 15 throughout the entire portion thereof, and thus mowed grass can pass below the rear guide plates 40 and flow out to the rear of the cutting blade housing 12.

When the rear guide plates 40 are attached, the mower apparatus 10 serves as a mower apparatus for mulching in which mowed grass that has been mowed with the rotating blades 13, 14, and 15 is guided by the front guide plates 32 and the rear guide plates 40, rotatively flows and retains in the rotation areas B of the rotating blades 13, 14, and 15, is finely cut with the rotating blades 13, 14, and 15, and then discharged out of the cutting blade housing.

In a second embodiment, FIG. 7 shows the mower apparatus 10 according to another embodiment. In this mower apparatus 10, the cutting blade housing 12, the rotating blades 13, 14, and 15, and the structure for supporting and driving the rotating blades 13, 14, and 15 are the same as those in the mower apparatus 10 in the first embodiment, but the structure for discharging mowed grass is different from that in the mower apparatus 10 in the first embodiment. Thus, only the structure for discharging mowed grass is described.

In this mower apparatus 10, the internal portion of the cutting blade housing 12 is provided with: the front guide plates 32 that are arranged in front of and close to the rotation areas B of the rotating blades 13, 14, and 15; a guide plate 45 (auxiliary plate) for the side blade that is disposed behind, with respect to the cutting blade housing, the end portion of the front guide plate 32 on the side where the center rotating blade 14 is positioned, wherein this front guide plate 32 corresponds to the side rotating blade 13 that is one of the pair of side rotating blades 13 and 15; a guide plate 46 (auxiliary plate) for the center blade that is disposed behind, with respect to the cutting blade housing, an intermediate portion of the front guide plate 32 corresponding to the center rotating blade 14; the rear guide plate 30 that is disposed outside, in the rear and lateral direction, the rotation area B of the one side rotating blade 13; and the rear guide plate 31 that is disposed outside, in the rear and lateral direction, the rotation area B of the other side rotating blade 15.

The guide plates 32, 45, and 46 are made of band plates, and supported on the lower face of the top plate 12a such that the lateral width direction of the band plates is vertical in the cutting blade housing and such that the lateral width of the band plates is projected downward in the cutting blade housing from the top plate 12a of the cutting blade housing 12.

The guide plate 45 corresponding to the one side rotating blade 13 is disposed at a higher position than the side rotating blade 13 throughout the entire guide plate 45. The guide plate 45 is formed in the shape of a straight line in the fore-and-aft direction in the cutting blade housing when viewed from above or below the cutting blade housing throughout the entire length of the guide plate 45. The front end portion of the guide plate 45 and the front guide plate 32 are formed in a continuous line. A front end portion 45a of the guide plate 45 passes through the rotation area B of the side rotating blade 13 in the fore-and-aft direction in the cutting blade housing when viewed from above or below the cutting blade housing. A rear end portion 45b of the guide plate 45 projects to the rear from the rotation area B of the side rotating blade 13.

The guide plate 46 corresponding to the center rotating blade 14 is disposed at a higher position than the center rotating blade 14 throughout the entire guide plate 46. The guide plate 46 is formed such that: a curved portion 46a that is curved when viewed from above or below the cutting blade housing is provided on the front end of the guide plate 46; and a linear portion 46b in the fore-and-aft direction in the cutting blade housing when viewed from above or below the cutting blade housing is provided on the rear end of the guide plate 46. The entire curved portion 46a and the front portion of the linear portion 46b pass through the rotation area B of the center rotating blade 14 in the fore-and-aft direction in the cutting blade housing when viewed from above or below the cutting blade housing. The rear portion of the linear portion 46b projects to the rear from the rotation area B of the center rotating blade 14.

The mower apparatus 10 is configured as a rear discharge type mower apparatus: that is provided with the rotating blades 13, 14, and 15 that can be driven to rotate in the rotation directions A about the axes P that are vertical in the cutting blade housing, at a plurality of locations that are arranged in the lateral direction in the cutting blade housing, inside the cutting blade housing 12; that mows lawn or grass with the rotating blades 13, 14, and 15 that rotate; and that discharges mowed grass through the mowed grass discharge port 19 in the rear portion of the cutting blade housing to the rear of the cutting blade housing 12 with discharged wind that has been generated by rotation of the wind-generating vanes F of the rotating blades 13, 14, and 15.

More specifically, the rotating blades 13, 14, and 15 are driven to rotate in the rotation directions A about the axes P of the rotating shafts 18 that are vertical in the cutting blade housing, by the drive force of the rotating shafts 18. Lawn or grass that has entered the rotation areas B of the rotating blades 13, 14, and 15 as the self-propelled chassis travels is mowed with the pair of blade portions C of the rotating blades 13, 14, and 15. At that time, the rotating blades 13, 14, and 15 generate discharged wind with the wind-generating vanes F positioned on the rear sides on the blade portions C on both ends of the rotating blades 13, 14, and 15.

Discharged wind that has been generated by the wind-generating vanes F of the one side rotating blade 13 flows so as to rotate in the rotation direction A of the side rotating blade 13 in the rotation area B of the side rotating blade 13, by being guided by the rear guide plate 30, the front guide plate 32, and the guide plate 45. In the rear portion of the rotation area B, the discharged wind is guided by the guide plate 45 toward the rear in the cutting blade housing, and then flows out through the mowed grass discharge port 19 to the rear of the cutting blade housing 12. Mowed grass that has been mowed with the side rotating blade 13 is transported by discharged wind that has been generated by the side rotating blade 13, guided by the front guide plate 32 and the guide plate 45, and then discharged through the mowed grass discharge port 19 to the rear of the cutting blade housing 12.

Discharged wind that has been generated by the wind-generating vanes F of the center rotating blade 14 flows so as to rotate in the rotation direction A of the center rotating blade 14 in the rotation area B of the center rotating blade 14, by being guided by the front guide plate 32 and the guide plate 46, and being suppressed by the guide plate 46 from leaking toward the side rotating blade 15. In the rear portion of the rotation area B, the discharged wind flows toward the mowed grass discharge port 19 by being guided by the guide plate 46 toward the rear in the cutting blade housing, and then flows out through the mowed grass discharge port 19 to the rear of the cutting blade housing 12. Mowed grass that has been mowed with the center rotating blade 14 is transported by discharged wind that has been generated by the center rotating blade 14, guided by the front guide plate 32 and the guide plate 46, and then discharged through the mowed grass discharge port 19 to the rear of the cutting blade housing 12.

Discharged wind that has been generated by the wind-generating vanes F of the other side rotating blade 15 flows so as to rotate in the rotation direction A of the side rotating blade 15 in the rotation area B of the side rotating blade 15, by being guided by the front guide plate 32 and the rear guide plate 31. In the rear portion of the rotation area B, the discharged wind flows toward the mowed grass discharge port 19 by being guided by the rear guide plate 31, and then flows out through the mowed grass discharge port 19 to the rear of the cutting blade housing 12. Mowed grass that has been mowed with the side rotating blade 15 is transported by discharged wind that has been generated by the side rotating blade 15, guided by the front guide plate 32 and the rear guide plate 31, and then discharged through the mowed grass discharge port 19 to the rear of the cutting blade housing 12.

In a third embodiment, as shown in FIG. 8, a pair of right and left ground contacting sliders or sledges 50 and 51 in positions laterally inwardly of rearward lateral ends of the cutting blade housing 12.

More specifically the pair of right and left ground contacting sliders 50 and 51 are located in lateral intermediate positions of the cutting housing 12 so that they are located laterally inwardly of each of the rollers 16 and outside an area directly rearwardly of the opening OP. One of the sliders 50 is located rearwardly of the linear guide plate 35 and forwardly of the front wheel 1 of the vehicle.

As shown in FIGS. 9 and 10, each of the slider 50 or 51 is formed with a metal plate which is bent so as to have a slider plate 52, a front attachment plate 53 whose lower end is connected to the forward end of the slider plate 52, a rear attachment plate 54 whose lower end is connected to the rearward end of the slider plate 52, and a connecting plate 56 connecting an upper portions of the front attachment plate 53 and the rear attachment plate 54 so as to form a loop with a with a lateral through opening as seen in a side view. The lateral width of these plates are substantially the same. Each of the slider 50 or 51 is fixedly attached the cutting blade housing 12 by connecting the connecting plate 56 to the lower surface of the top plate 12a of the cutting blade housing 12 by bolts 55 and nuts to support the rear of the mowing apparatus 10 by contact with the slider plate 53.

The cut grass ejected through the discharge port 19 toward the front wheel 1 located rearwardly of the slider 50 is deflected by the slider plate 52, the front attachment plate 53 and the rear attachment plate 54 to be directed to either right or left of the front wheel 1, making it less likely to hit and attach to the front wheel 1.

As shown in FIGS. 8 and 9, a sheet metal cover 60 spanning the entire lateral width of the ejecting port 19 of the cutting blade housing 12 on the upper surface in the rear of the top plate 12a of the cutting blade housing 12. The cover plate 60 has a right outer cover 61 located laterally outwardly with respect to the right front wheel 1, a left outer cover 61 located laterally outwardly with respect to the left front wheel 1 and a middle cover 62 located laterally inwardly with respect to the right and left front wheels 1.

As shown in FIGS. 8 and 9, the metal sheet plate cover 60 is pivotable about an axis X with respect to the cutting blade housing 12 by virtue of the fact that the cover side connecting brackets 63 attached to the cover 60 at a plurality of lateral locations and the corresponding housing side connecting brackets 64 are pivotably connected by laterally extending connecting shafts 65 with axis X. Thus the cover 60 is pivotable between a lower operative position wherein the cover 60 rests on and supported by the rear edge portion 12d of the housing 12 and extends rearwardly beyond the housing 12 to cover over the discharge port 19 and an upper attaching position wherein the cover 60 is pivoted upwardly from the lower operative position. The cover plate 60 is urged toward its lower operative position by a coil spring 66 provided around each of the pivot shafts 65.

As shown in FIGS. 12 and 13, the right and left rollers 16 are pivotably attached to the mounting brackets 68 fixed to the rear of the cutting blade housing 12 via the roller supports 67 with the right and left support arms 67a that are pivotable about the connecting shaft 69. Thus each of the rollers 16 may be pivoted about the axis Y between the lower position wherein the support arm 67a extends from the bracket 68 and the roller 16 is in contact with the ground and an upper position elevated with respect to the lower position. Each of the rollers 16 may be locked in its lower position by means of the lock pin 71 slidably supported to the support arm 67a and the bracket 70 with the pin 71 urged in the locking position by the lock spring 72. By inserting the free end of the lock pin 71 into the pin hole 68a of the bracket 68, the roller 16 is locked in place.

Therefore, when the mower apparatus 10 is in its lower operating position, the right and left outer covers 61 and the inner cover 62 are in the lower operating position because of the urging force of the coil spring 66. This causes the cut grass flying off laterally outwardly of the right and left front wheels from the discharge port 19 to be deflected downwardly by the outer covers 61 and to hit the ground. Cut grass discharged between the right and left front wheels 1 from the discharge port 19 would be deflected by the inner cover 62 downwardly to hit the ground. Thus the covers 61 and 62 restrict the lateral spread of the cut grass flying off the apparatus 10 and prevent cut grass from sticking to underneath the vehicle such as the transmission case 5.

When cleaning or inspecting the underside of the cutting blade housing of the mover apparatus 10, the underside of the housing 12 may be exposed by rotating it to face forward by releasing the connections between the right and left support arms 141 and the housing 12 by releasing the restriction member 145, and by lifting the linkage mechanism 6, which allows the upward rotation of the apparatus 10 with respect to the support arms 141 under its own weight. The housing 12 stands on the ground on its end. The right and left rollers 16 are placed in the lock release positions away from the lower operating positions by removing the lock pins 71 from the holes 68a of the mounting brackets 68 and placing the spring receiving member 73 of the lock pin 71 in the recess 70a (FIG. 13) of the bracket 70. The right and left rollers 16 are then rotated toward the positions upwardly with respect to the housing 12 about the pivot point Y due to contact against the ground as the mover apparatus 10 is rotated with respect to the support arms 141. The outer covers 61 and the inner cover 62 are then rotated by contact against the ground about X with respect to the housing, thus allowing the housing 12 to stand on its end without the rollers 16, outer covers 61, or inner cover 62 impeding the rotation process.

The invention claimed is:

1. A rear discharge type mower apparatus comprising:
    a blade housing having a top plate, a front wall and at least one side wall;
    at least two support shafts supported by the blade housing and extending vertically;
    a rotatable blade supported by each of the at least two support shafts, a tip end of each blade forming a rotation path;
    a first front guide plate and a second front guide plate, each of the first and second front guide plates being located rearwardly of the front wall and having a shape extending substantially along the rotation path of a corresponding blade;
    a first auxiliary plate extending straight from a rear end of a portion connecting the first front guide plate to the second front guide plate through a region radially inside the rotation path of the corresponding blade to a rear region of the blade housing, and
    a second auxiliary plate comprising a curved portion and a linear portion extending rearwardly of the curved portion, the curved portion and the linear portion extending from a forward region of the second front guide plate through a region radially inside the rotation path of the corresponding blade to a rear region of the blade housing,
    wherein the linear portion and the first auxiliary plate extending parallel to each other such that an opening that is opposed to a mowed grass discharge opening is formed by rearward ends of the linear portion and the first auxiliary plate, and
    wherein lower edges of the first and second auxiliary plates are closer to the top plate than the corresponding blade.

2. A mower apparatus according to claim 1 further comprising:
    a ground contact member located in a rearward edge region of the top plate and in a lateral position outside an area directly rearwardly of the opening,
    wherein the auxiliary plate extends to the region of the ground contact member.

3. A mower apparatus according to claim 1 further comprising:
    a cover member pivotably attached to the top plate in the rearward edge region of the top plate, the cover member extending rearwardly beyond the top plate.

* * * * *